(12) United States Patent
Nagasawa

(10) Patent No.: US 7,558,670 B2
(45) Date of Patent: Jul. 7, 2009

(54) GUIDED VEHICLE SYSTEM AND TRANSPORTATION METHOD

(75) Inventor: Atsuo Nagasawa, Hashima-gun (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 406 days.

(21) Appl. No.: 11/482,836

(22) Filed: Jul. 10, 2006

(65) Prior Publication Data

US 2007/0016366 A1    Jan. 18, 2007

(30) Foreign Application Priority Data

Jul. 12, 2005    (JP) .............................. 2005-202450

(51) Int. Cl.
*G01C 21/30* (2006.01)

(52) U.S. Cl. .................... 701/209; 701/26; 701/201; 701/200; 340/995.21

(58) Field of Classification Search ............ 701/23, 701/24, 26, 200, 209, 210, 201; 340/995.19, 340/995.21; 342/357.03
See application file for complete search history.

(56) References Cited

U.S. PATENT DOCUMENTS

| 6,591,172 | B2* | 7/2003 | Oda et al. ..................... 701/23 |
| 6,889,134 | B2* | 5/2005 | Nakane et al. .............. 701/202 |
| 6,954,694 | B2* | 10/2005 | Nagamune .................. 701/200 |
| 7,117,083 | B2* | 10/2006 | Rothman et al. ............ 701/200 |

FOREIGN PATENT DOCUMENTS

| JP | 11-85280 A | 3/1999 |
| JP | 2001-100842 | 4/2001 |

* cited by examiner

*Primary Examiner*—Gertrude Arthur Jeanglaud
(74) *Attorney, Agent, or Firm*—Westerman, Hattori, Daniels & Adrian, LLP.

(57) ABSTRACT

When the destination of a guided vehicle 24 is changed from a point 20 to a point 18, the speed of the guided vehicle 24 is controlled so that a new travel route can be calculated before the guided vehicle 24 arrives at the nearest branch point 10. The guided vehicle 24 cancels unnecessary blocking for straight traveling at the branch point 10, for straight traveling at a merge point 14, and for branch traveling at a branch point 12, and request blocking for branch traveling at the branch point 10 again, and travels based on the new route.

2 Claims, 5 Drawing Sheets

1) STOPPABLE BEFORE BRANCH SECTION

2) UNSTOPPABLE BEFORE BRANCH SECTION

GUIDED VEHICLE SYSTEM AND TRANSPORTATION METHOD

TECHNICAL FIELD

The present invention relates to a guided vehicle system and a transportation method. In particular, the present invention relates to a technique of changing the destination of the guided vehicle.

BACKGROUND ART

In a system including guided vehicles such as overhead traveling vehicles, a controller assigns a transportation command to the guided vehicle for allowing the guided vehicle to travel to the destination in the transportation command. In an intersection such as a branch point or a merge point, the guided vehicle requests blocking of the intersection to the controller. After the guided vehicle passes the intersection, the guided vehicle requests cancel of blocking to the controller (Japanese Patent No. 3367485). If the transportation command is changed in the middle of executing the command, and the destination is changed as a result of the change of the transportation command, the guided vehicle stops temporarily, and the travel route to the new destination is calculated. Then, the guided vehicle starts traveling again. However, if the guided vehicle stops, the transportation efficiency is lowered. Further, in the case where a plurality of guided vehicles are traveling successively with a predetermined distance between the vehicles, the following vehicles also need to stop disadvantageously.

SUMMARY OF THE INVENTION

An object of the present invention is to improve the transportation efficiency by making it possible to change the destination of a guided vehicle without requiring the guided vehicle to stop traveling.

Secondary object of the present invention is to improve the transportation efficiency in a system by canceling blocking which is no longer required by the change of the destination.

Secondary object of the present invention is to avoid interference between the guided vehicle whose destination has been changed and the following, other guided vehicles.

The present invention relates to a guided vehicle system in which a guided vehicle travels to a destination on a travel route instructed by a guided vehicle controller, travel permission to intersections comprising branch points and merge points are requested as blocking from the guided vehicle to the guided vehicle controller, and the guided vehicle controller permits the blocking. The guided vehicle system comprises means for controlling the speed of the guided vehicle for allowing the guided vehicle to obtain a new travel route before the guided vehicle arrives at the nearest branch point without any stop when the destination of the guided vehicle is changed by the guided vehicle controller, and means for requesting blocking of the branch points and the merge points based on the obtained new travel route to the guided vehicle controller.

It is preferable that the blocking request means requests to cancel the requested blocking of intersections deviated from the new travel route, to the guided vehicle controller.

It is particularly preferable that, at the branch point, two types of blocking comprising blocking for straight traveling for allowing the guided vehicle to travel through the branch point along a straight lane, and blocking for branch traveling for allowing the guided vehicle to travel through the branch point along a branch lane are provided, the blocking for straight traveling can be permitted to a plurality of guided vehicles at the same time, and the blocking for branch traveling can be permitted to only one guided vehicle at the same time, and when blocking for straight traveling is permitted at the branch point to a guided vehicle on a travel route before destination change and the blocking request means requests to cancel the blocking for straight traveling and requests blocking for branch traveling, means provided in the guided vehicle controller cancels another blocking for straight traveling at the branch point permitted to a following vehicle.

In the present invention, when the destination of the guided vehicle is changed, the speed of the guided vehicle is controlled so that the guided vehicle can obtain a new travel route before the guided vehicle arrives at the nearest branch point. The guided vehicle requests blocking of branch points and merge points based on the obtained travel route, to the guided vehicle controller. Except the unusual case where a point before the branch point is designated as a stop position, there is no change in the travel route up to the nearest branch point. Therefore, if the guided vehicle can generates the new travel route, or receives the new travel route from the guided vehicle controller before the guided vehicle arrives at the nearest branch point, the travel route can be changed without requiring the guided vehicle to stop traveling.

Further, if the requested blocking of the intersection deviated from the new travel route is cancelled, unnecessary blocking is eliminated, and efficiency in the system is improved.

In the case where the blocking for straight traveling can be permitted to a plurality of guided vehicles at the same time, and the blocking for branch traveling can be permitted to only one guided vehicle at the same time, when the travel route at the branch point is changed from straight traveling to branch traveling by the change of the destination, if the blocking for straight traveling is permitted to the following guided vehicles, interference with the following guided vehicles may occur. Therefore, in this case, if the guided vehicle controller can cancel the permission of blocking for traveling straight through the branch point given to the following vehicles, it is possible to prevent the interference with the following guided vehicles.

BRIEF DESCRIPTION OF THE DRAWINGS

In FIG. 5, the graph 1) shows a pattern in a case where the guided vehicle can stop before a branch point, and the graphs 2) shows a pattern in a case where the guided vehicle cannot stop before the branch point.

BRIEF DESCRIPTION OF THE SYMBOLS

Figure 1:
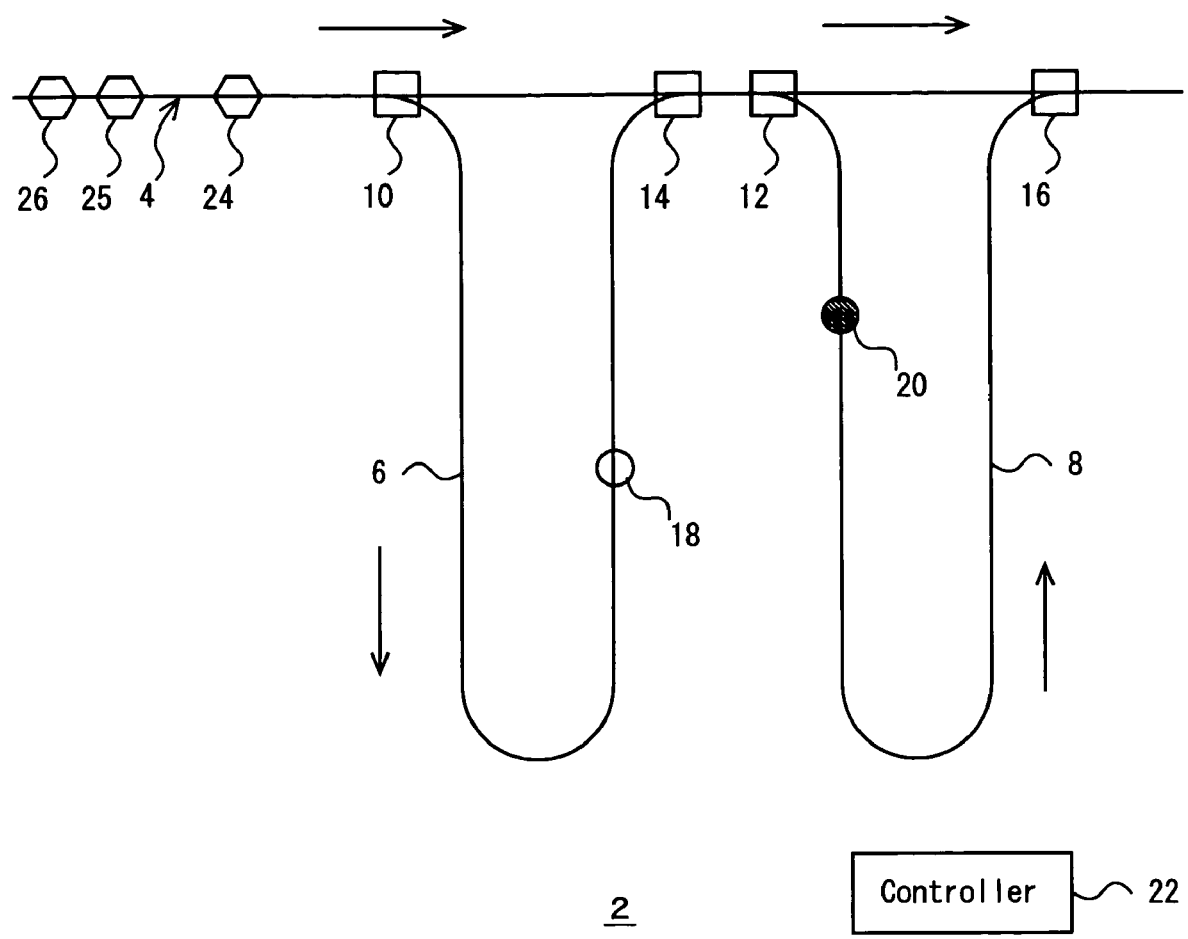
FIG. 1 is a plan view showing the layout of a guided vehicle system according to an embodiment.
Figure 2:
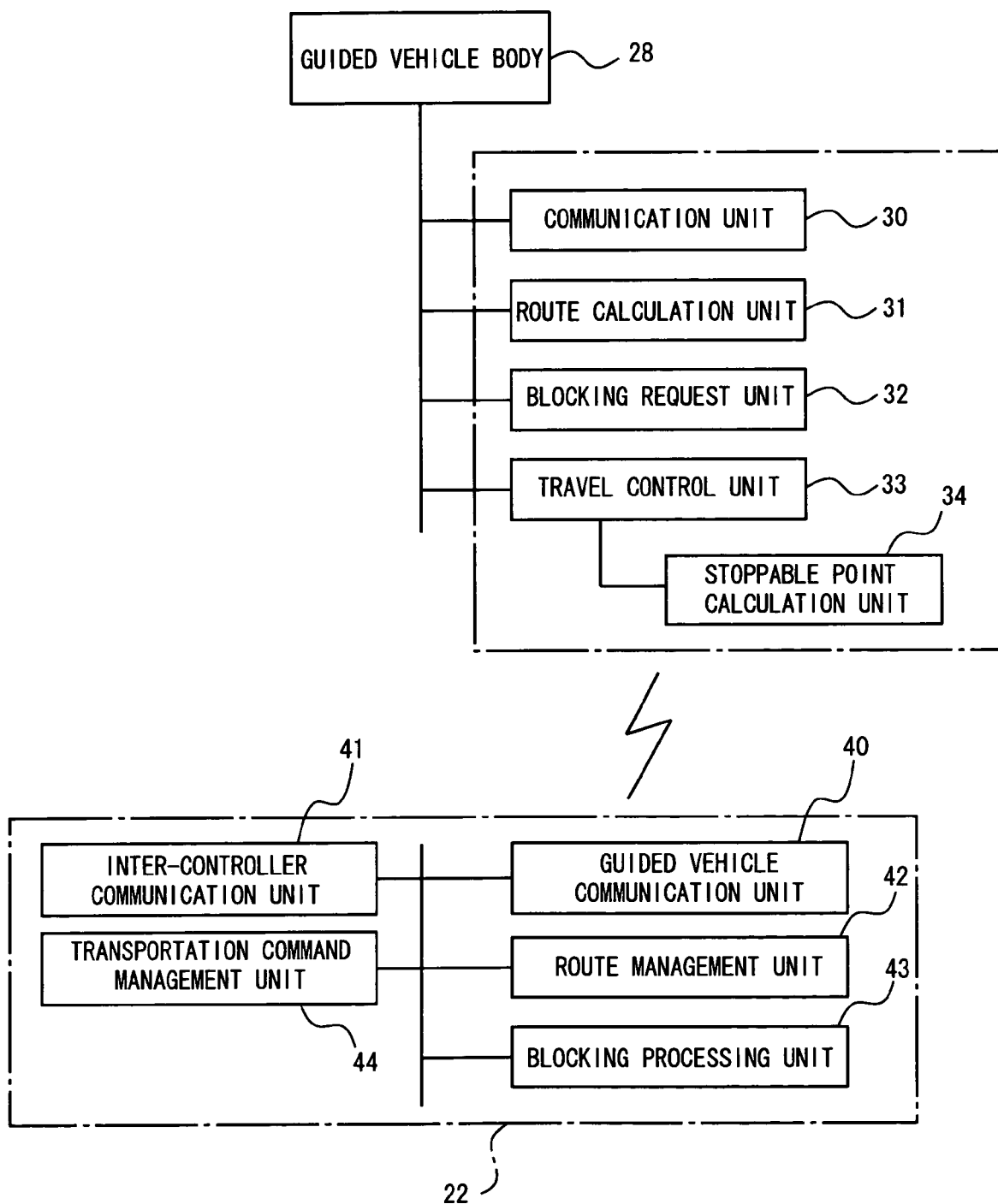
FIG. 2 is a block diagram showing a control unit of a guided vehicle and a guided vehicle controller according to the embodiment.
Figure 3:
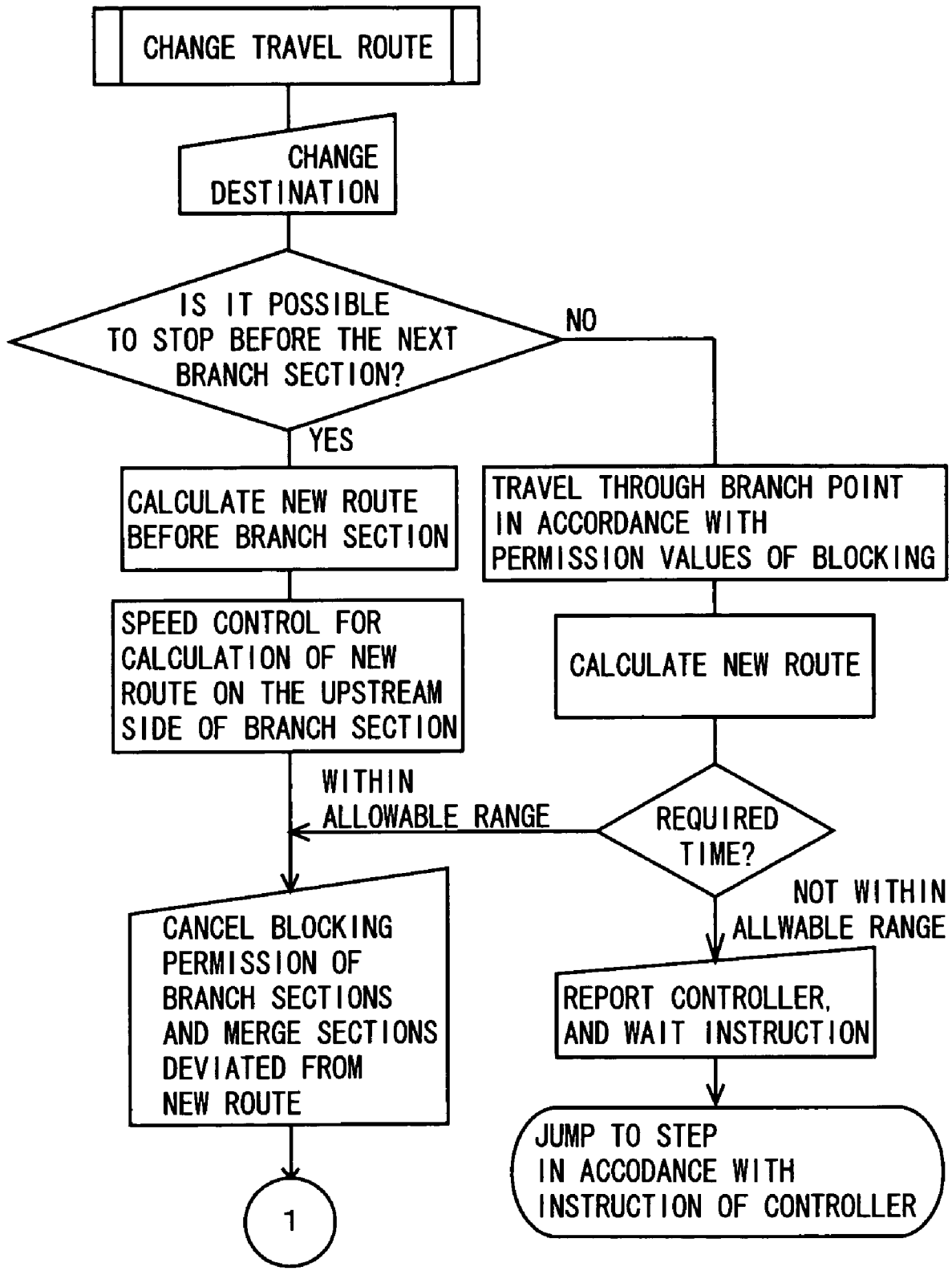
FIG. 3 is a flowchart showing the first half of a control algorithm in the guided vehicle at the time of changing the destination according the embodiment.
Figure 4:
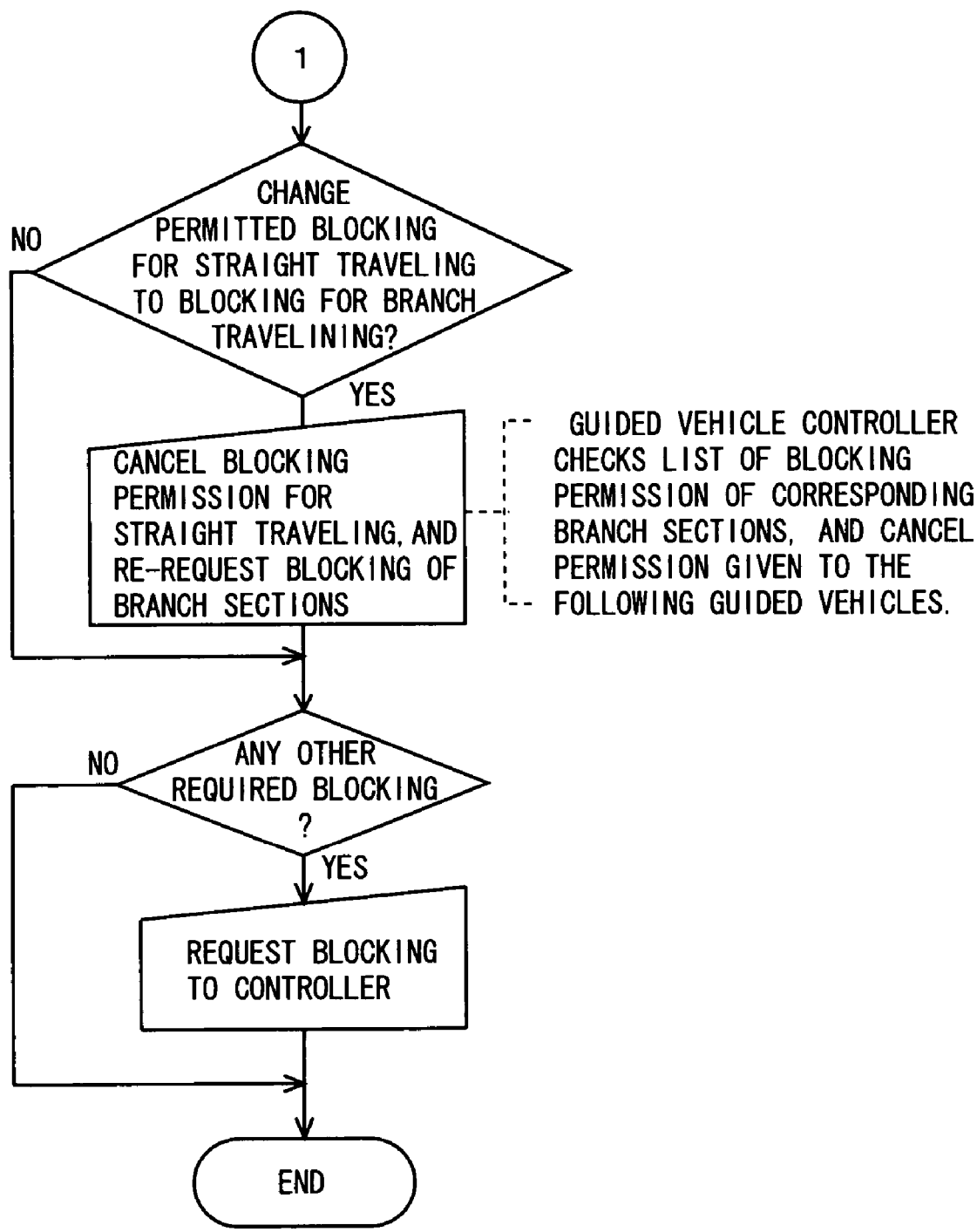
FIG. 4 is a flowchart showing the last half of the control algorithm in the guided vehicle at the time of changing the destination according to the embodiment.

2 Guided vehicle system
4 Inter-bay route 6, 8 Intra-bay route
10, 12 Branch point
14, 16 Merge point
18, 20 Destination point
22 Guided vehicle controller
24-26 Guided vehicle
28 Guided vehicle body
30 Communication unit
31 Route calculation unit
32 Blocking request unit
33 Travel control unit
34 Stoppable point calculation unit
40 Guided vehicle communication unit
41 Inter-controller communication unit
42 Route management unit
43 Blocking processing unit
44 Transportation command management unit

EMBODIMENT

Hereinafter, an embodiment in the most preferred form for carrying out the present invention will be described.

A guided vehicle system 2 according to the embodiment will be described with reference to FIGS. 1 to 5. In the specification, it is assumed that overhead traveling vehicles are used as guided vehicles. In the drawings, a reference numeral 4 denotes an inter-bay route as a main route for connecting intra-bay routes 6, 8, or the like. Reference numerals 10 and 12 denote branch points, and reference numerals 14, 16 denote merge points. The branch points 10, 12, and the merge points 14, 16 are also referred to as the intersections, collectively. Further, the branch points are also referred to as the branch sections, and the merge points are also referred to as the merge sections. In the embodiment, it is assumed that the destination of a guided vehicle 24 is changed from a destination point 20 to a destination point 18. Reference numerals 25, 26 denote the following guided vehicles. Though the branch points 10, 12 and the merge points 14, 16 are provided at the borders between the inter-bay route 4 and the intra-bay routes 6, 8, the positions of the branch points 10, 12 and the merge points 14, 16 can be determined arbitrarily. A reference numeral 22 denotes a guided vehicle controller for assigning transportation commands to the respective guided vehicles 24 to 26 to designate destinations. In response to requests for blocking the branch points 10, 12, and the merge points 14, 16, the guided vehicle controller 22 permits the blocking requests.

A guided vehicle body 28 has a travel unit, an elevation drive unit of an elevation frame, a lateral feeding unit of an elevation drive unit, or the like. Under the control of the control unit of the guided vehicle and the guided vehicle controller, the guided vehicle body 28 travels through the routes 4, 6, and 8 and transports articles to/from load ports or the like. A communication unit 30 is used for communication between the guided vehicles, and communication between the guided vehicle and the controller 22. A route calculation unit 31 stores a map of travel routes such as the inter-bay route 4, and the intra-bay routes 6, 8. Based on a suitable origin point, positions of the intersections such as the branch points 10, 12, and the merge points 14, 16, addresses of stop positions such as the destination points 18, 20, and the required travel time for each of the main travel segments are written in the map.

Further, the guided vehicle retrieves data of the current position on the travel route by suitable means, and stores the retrieved data in the route calculation unit 31, for example. Each time information about the destination is provided by a transportation command, the route calculation unit 31 calculates a travel route to the destination. In the case where the destination is changed by the change of the transportation command, in the case where the congestion condition in the travel route is changed, e.g., in the case where the require time is updated by the guided vehicle controller 22, or in the case where any trouble occurs, or any trouble is eliminated in the travel route to cause a change of travelable portion in the travel route, the travel route is calculated again.

When the guided vehicle travels through any of the segments that require exclusive control such as the branch points 10, 12 and the merge points 14, 16, a blocking request unit 32 sends a request for permission to travel through the segment (blocking the segment) to the guided vehicle controller 22. If the blocking is permitted, the blocking request unit 32 stores the information to this effect. After the guided vehicle passes the permitted travel segment, the blocking request unit 32 requests to cancel the blocking to the guided vehicle controller 22.

The guided vehicle has a front monitor sensor (not shown) for preventing collisions. Therefore, a plurality of the guided vehicles can successively travel straight through the branch point 10, 12 along a straight lane and can also successively travel straight through the merge point 14, 16 along a straight lane. In the case where the guided vehicle travels through a branch lane of the branch point 10 or 12, or in the case where the guided vehicle travels into the merge point 14 or 16 from a merge lane with a curve (from the side of the intra-bay route 6 or 8), it is difficult to monitor the leading guided vehicle on the front side of the curve. Therefore, the guided vehicles need to travel through the branch lane or the merge lane one by one without relying on the front monitor sensor. Thus, in the case of straight traveling through the branch points 10, 12 or the merge points 14, 16, permission of blocking can be given to a plurality of guided vehicles at the same time. However, in the case of branch traveling or merge traveling, permission of blocking cannot be given to a plurality of guided vehicles at the same time. Further, in the case where permission of straight traveling is given to a plurality of guided vehicles, other guided vehicles must not be present between the guided vehicles having the permission. In the case of branch traveling from the branch point 10, 12 or merge traveling from the curve leading into the merge point 14, 16, blocking is performed for the guided vehicles one by one, i.e., blocking is performed only for one vehicle at the same time.

When the blocking request unit 32 obtains a new travel route, among the branch points and the merge points for which blocking requests have been made, if there are any branch points and merge points which are deviated from the new travel route, the blocking request unit 32 cancels the blocking requests for the branch points and the merge points deviated from the new travel route. In the case where the travel route at the branch point is changed from the branch lane to the straight lane, or in the case where the travel route at the merge point is changed from the curved merge lane to the straight lane, the blocking requests are not cancelled. It may be contemplated that, after the blocking requests are cancelled, blocking for straight traveling is requested again. However, in this case, it takes time to communicate with the guided vehicle controller. That is, a communication period from the time when blocking is requested to the guided vehicle controller again and the time when permission to the request is obtained from the guided vehicle controller is required. If the guided vehicle arrives at the branch point or the merge point for which blocking is requested during the communication period, the guided vehicle needs to stop. Therefore, in the embodiment, in the case where the travel route at the branch point is changed from the branch lane to the straight lane, or in the case where the travel route at the merge point is changed from the curved merge lane to the straight lane, the obtained blocking permission is not cancelled. However, in the case where the blocking for straight traveling along the straight lane is changed to the blocking for branch traveling along the branch lane or the merge traveling along the curved merge lane, the permission to the blocking for straight traveling may be issued beforehand to the following vehicle, therefore, the blocking request for straight traveling is cancelled, and the blocking for branch traveling or merge traveling is requested again.

A travel control unit 33 controls the travel of the guided vehicle body 28. The guided vehicle travels through the branch points 10, 12 and the merge points 14, 16 while preventing the interference with the leading guided vehicle using the front monitor sensor in accordance with the permission of blocking. If permission of blocking of a branch point or a merge point cannot be obtained, the guided vehicle stops, and waits before the point. Further, under the travel control of the travel control unit 33, the guided vehicle stops at the destination point 18, 20, or the like. The travel control unit 33 controls the travel of the guided vehicle body 28 in accordance with the travel route calculated by the route calculation unit 31, and in accordance with the remaining travel distance to the destination point, speed restrictions at the travel points 10, 12, and the merge points 14, 16 or the like.

A stoppable point calculation unit 34 calculates the distance from the current position to the position of a stoppable point where the guided vehicle can stop to determine whether the stoppable point is before or after the nearest branch point. If the stoppable point is positioned before the nearest branch point, the travel control unit 33 implements speed control such that the required travel time to the nearest branch point is the time needed for calculation of the travel route or more, and the guided vehicle can stop before the nearest branch point. Travel control for allowing the guided vehicle to stop before the nearest branch point is implemented in preparation for the case where there is a change from straight traveling along the straight lane to branch traveling along the branch lane at the nearest branch point in the new travel route. In the case where, at the nearest branch point, blocking for branch traveling is permitted in the original travel route, travel control for allowing the guided vehicle to stop before the nearest branch point is not necessary. If the guided vehicle cannot stop before the nearest branch point, travel control is implemented such that the guided vehicle travels through the branch point in accordance with the current blocking permission. The travel control unit 33 requests the route calculation unit 31 to calculate a new travel route from the traveled point to the nearest branch point in accordance with the value of the current blocking permission.

The guided vehicle controller 22 has a guided vehicle communication unit 40 for communication with the guided vehicle. Further, an inter-controller communication unit 41 communicates with controllers at the upper level, production controllers or the like. A route management unit 42 stores a map of travel routes, and manages positions of the guided vehicles on the travel routes, congestion conditions in the travel routes, and troubles in the travel routes. Further, the route management unit 42 sends data of the required travel time in accordance with the congestion condition in the travel route to the route calculation unit 31 of the guided vehicle through the guided vehicle communication unit 40. Likewise, in the case where any trouble occurs in the travel route, or any trouble is eliminated in the travel route, information to this effect is sent to the route calculation unit 31.

In the embodiment, the new travel route is calculated by the route calculation unit 31 of the guided vehicle. Alternatively, the new travel route may be calculated by the route management unit 42. In this case, when the guided vehicle receives a command for changing the destination, the guided vehicle sends a confirmation signal back to the guided vehicle controller 22. Then, the guided vehicle controller 22 sends the new travel route to the guided vehicle. When the travel control unit 33 of the guided vehicle receives the command for changing the destination, speed control is implemented such that the required travel time to the nearest branch point becomes the expected time needed for receiving the new travel route or more.

A blocking processing unit 43 processes blocking of the branch point 10, 12 or the merge point 14, 16, and stores a list of guided vehicles that have requested blocking and have not obtained permission, information about the guided vehicles that have obtained the blocking permission, and content of the permission (straight/branch, straight/merge), and corrects the list in accordance with the blocking cancel requests from the guided vehicles. A transportation command management unit 44 converts a transportation request received by the inter-controller communication unit 41 into a transportation command, assigns the transportation command to the guide vehicle, and manages the condition of executing the transportation command.

Operation of the embodiment will be described. For example, in FIG. 1, it is assumed that the destination of the guided vehicle 24 is changed from the point 20 to the point 18. Further, it is assumed that the guided vehicle 24 has obtained the permission of blocking for straight traveling at the branch points 10, 12, and the merge point 14. Likewise, it is assumed that the following guided vehicles 25, 26 have obtained the permission of blocking for straight traveling at the branch point 10.

If the destination of the guided vehicle is changed, it is determined whether the guided vehicle can stop before the next branch point or not. If the guide vehicle can stop before the next branch point, speed control is implemented such that a new travel route can be calculated before the guided vehicle arrives at the branch point. If the guided vehicle cannot stop before the next branch point, the guided vehicle travels through the branch point in accordance with the values of the permitted blocking, and a new route is calculated assuming that the guided vehicle passes the nearest branch point. Then, it is determined whether the required time in the new route is within an allowable range or not. If the required time is not within the allowable range, information to this effect is reported to the controller, and an instruction from the controller is awaited. If the required time is within the allowable range, the guided vehicle travels along the new route.

Figure 5:
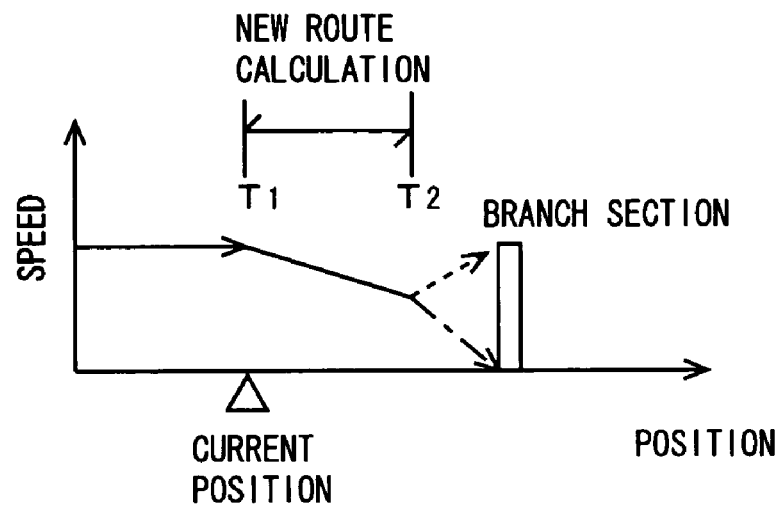
FIG. 5 includes graphs showing speed patterns of the guided vehicle when the destination is changed.
Figure 5:
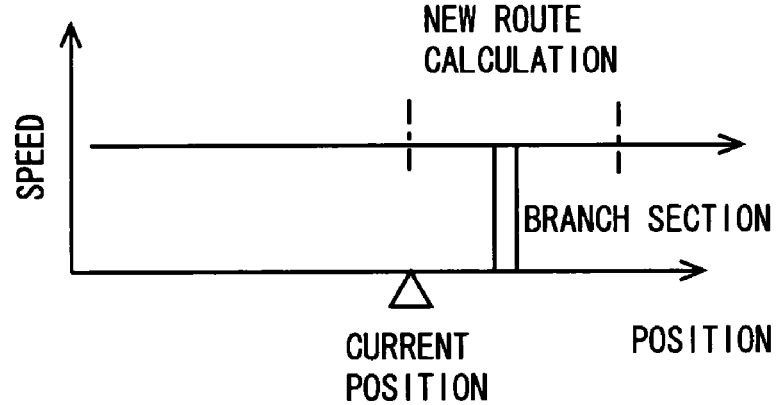

Speed control in the travel route up to the branch point is shown in FIG. 5. As shown in the graph 1), in the case where the guided vehicle can stop before the branch point, a new route is calculated in a period from the current time T1 to time T2. Further, in preparation for the case where the travel route at the branch point is changed from the straight lane to the branch lane, the speed up to the time T2 is controlled such that the guided vehicle can stop from the position at the time T2. In the case where the guided vehicle cannot stop before the branch point, the guided vehicle travels through the branch point in accordance with the values of the permitted blocking from the current position, and in the meanwhile, the new route is calculated. The guided vehicle requests the guided vehicle controller to cancel blocking permission for the branch points and the merge points deviated from the new route. In the case of FIG. 1, the blocking permission for straight traveling at the merge point 14 and the branch point 12 are cancelled. The cancel or re-request of blocking is performed after the new travel route to the destination is generated.

Since the travel route at the nearest branch point 10 is changed from the straight lane to the branch lane, after the new route is calculated, blocking for straight traveling at the branch point 10 is canceled, and blocking for branch traveling at the branch point 10 is newly requested. If blocking is not permitted before the guided vehicle arrives at the branch point 10, the guided vehicle stops before the branch point 10.

When the guided vehicle 24 travels through the branch point 10 along the branch lane, since blocking for straight traveling at the branch point 10 is permitted to the following guided vehicles 25, 26, the guided vehicles 25, 26 may collide with the guided vehicle 24. Therefore, the guided vehicle controller checks the list of blocking permission to the following guided vehicle for the branch point 10, and cancels the blocking permission. As a result, the guided vehicles 25, 26 newly request blocking for straight traveling at branch point 10.

When the destination of the guided vehicle 24 is changed, and the guided vehicle 24 obtains the permission of blocking for branch traveling at the branch point 10, the guided vehicle 24 travels through the branch point 10 along the branch lane. Further, if there is any branch point or merge point that requires blocking, the guided vehicle requests blocking of the point to guided vehicle controller, and travels to the destination point 18. The order of canceling unnecessary blocking permission, changing the request from blocking for straight traveling to blocking for branch traveling, and making blocking requests for the other branch points or merge points can be determined arbitrarily. However, preferably, all of these operations are performed after calculation of the new travel route.

In FIG. 1, in the case of changing the destination from the destination point 18 to the destination point 20, alternatively, the guided vehicle 24 may cancel the blocking permission for branch traveling at the branch point 10, and request the blocking permission for straight traveling at the branch point 10 again. However, since blocking for branch traveling is permitted, blocking of the branch point 10 is not permitted to the other guided vehicles. Therefore, in order to reduce the time needed for communication with the guided vehicle controller, though the guided vehicle 24 has the blocking permission for branch traveling, the guided vehicle 24 travels straight through the branch point 10, and at the same time, for example, requests a blocking permission for straight traveling at the merge point 14 and requests a blocking permission for branch traveling at the branch point 12. Also in this case, in order to make it possible to calculate the new route before the guided vehicle 24 arrives at the nearest branch point 10, speed control of the guided vehicle 24 is implemented. The guided vehicle 24 should request cancel of blocking and request new blocking along the new route after calculation of the new route is finished.

The invention claimed is:

1. A guided vehicle system comprising a guided vehicle traveling to a destination on a travel route instructed by a guided vehicle controller, and travel permission to an intersection having at least one of a branch point and a merge point requested as blocking from the guided vehicle to the guided vehicle controller, the guided vehicle controller permitting the blocking, the guided vehicle system further comprising:

means for controlling speed of the guided vehicle for allowing the guided vehicle to obtain a new travel route before the guided vehicle arrives at a nearest branch point without any stop when the destination of the guided vehicle is changed by the guided vehicle controller; and blocking request means for requesting blocking of at least one of the branch point and the merge point based on the obtained new travel route to the guided vehicle controller, wherein the blocking request means requests to cancel the requested blocking of an intersection deviated from the new travel route, to the guided vehicle controller, and wherein at the branch point, two types of blocking comprising blocking for straight traveling for allowing the guided vehicle to travel through the branch point along a straight lane, and blocking for branch traveling for allowing the guided vehicle to travel through the branch point along a branch lane are provided, the blocking for straight traveling permitted to a plurality of guided vehicles at the same time, and the blocking for branch traveling permitted to only one guided vehicle at the same time, and wherein when blocking for straight traveling is permitted at the branch point to a guided vehicle on a travel route before destination change and the blocking request means requests to cancel the blocking for straight traveling and requests blocking for branch traveling, means provided in the guided vehicle controller cancels another blocking for straight traveling at the branch point permitted to a following vehicle.

2. A transportation method wherein a guided vehicle travels to a destination on a travel route instructed by a guided vehicle controller, travel permission to an intersection having at least one of a branch point and a merge point is requested as blocking from the guided vehicle to the guided vehicle controller, and the guided vehicle controller permits the blocking, the method comprising the steps of:

controlling speed of the guided vehicle for allowing the guided vehicle to obtain a new travel route before the guided vehicle arrives at a nearest branch point without any stop when the destination of the guided vehicle is changed by the guided vehicle controller; and requesting blocking of at least one of the branch point and the merge point based on the obtained new travel route to the guided vehicle controller, wherein the blocking request requests to cancel the requested blocking of an intersection deviated from the new travel route, to the guided vehicle controller; and wherein at the branch point, two types of blocking comprising blocking for straight traveling for allowing the guided vehicle to travel through the branch point along a straight lane, and blocking for branch traveling for allowing the guided vehicle to travel through the branch point along a branch lane are provided, the blocking for straight traveling permitted to a plurality of guided vehicles at the same time, and the blocking for branch traveling permitted to only one guided vehicle at the same time, and wherein when blocking for straight traveling is permitted at the branch point to a guided vehicle on a travel route before destination change and the blocking request requests to cancel the blocking for straight traveling and requests blocking for branch traveling, means provided in the guided vehicle controller cancels another blocking for straight traveling at the branch point permitted to a following vehicle.

* * * * *